(12) United States Patent
Kumagai

(10) Patent No.: US 12,403,757 B2
(45) Date of Patent: Sep. 2, 2025

(54) BATTERY PACK SUPPORT DEVICE FOR VEHICLE

(71) Applicant: Daimler AG, Stuttgart (DE)

(72) Inventor: Naotatsu Kumagai, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 550 days.

(21) Appl. No.: 17/780,780

(22) PCT Filed: Oct. 9, 2020

(86) PCT No.: PCT/JP2020/038377
§ 371 (c)(1),
(2) Date: May 27, 2022

(87) PCT Pub. No.: WO2021/106391
PCT Pub. Date: Jun. 3, 2021

(65) Prior Publication Data
US 2022/0410686 A1    Dec. 29, 2022

(30) Foreign Application Priority Data
Nov. 29, 2019  (JP) ................. 2019-217198

(51) Int. Cl.
*B60K 1/04*    (2019.01)
*B62D 21/02*   (2006.01)
(Continued)

(52) U.S. Cl.
CPC ............. *B60K 1/04* (2013.01); *B62D 21/02* (2013.01); *H01M 50/244* (2021.01);
(Continued)

(58) Field of Classification Search
CPC ......... B60K 2001/0438; H01M 50/249; B62D 21/02
See application file for complete search history.

(56) References Cited

U.S. PATENT DOCUMENTS 10,493,837 B1 *  12/2019  Angelo .................. B60L 50/66
10,899,214 B2 *   1/2021  Sloan .................... B62D 25/088
(Continued)

FOREIGN PATENT DOCUMENTS

CN    104802860 A    7/2015
CN    107364325 A    11/2017
(Continued)

OTHER PUBLICATIONS

English-language European Search Report issued in European application No. 20894134.4-1012 / 4063239 PCT/JP2020038377 dated Jan. 9, 2023 (Nine (9) pages).

(Continued)

*Primary Examiner* — Katy M Ebner
(74) *Attorney, Agent, or Firm* — Crowell & Moring LLP

(57) ABSTRACT

A vehicle battery pack support device for a battery pack mounted below a pair of side rails extending in a vehicle longitudinal direction and has a pair of side faces each facing in the longitudinal direction, includes a battery bracket for housing the battery pack and a frame bracket for coupling the side rails and the battery bracket. The battery bracket includes a first bracket covering the side faces of the battery pack, at least a portion of a top face that is continuous with the side faces, and at least a portion of a bottom face that is continuous with the side faces, the first bracket having a dimension in the vehicle width direction which is equal to or larger than the long side of the battery pack and a second bracket covering an end portion of the first bracket in the width direction coupled to the frame bracket.

4 Claims, 4 Drawing Sheets

(51) Int. Cl.
*H01M 50/244* (2021.01)
*H01M 50/249* (2021.01)

(52) U.S. Cl.
CPC ... *H01M 50/249* (2021.01); *B60K 2001/0438* (2013.01); *H01M 2220/20* (2013.01)

(56) References Cited

U.S. PATENT DOCUMENTS

| | | | | |
|---|---|---|---|---|
| 11,021,070 | B2 * | 6/2021 | Miyoshi | H01M 50/249 |
| 11,043,714 | B2 * | 6/2021 | Sloan | B60L 53/80 |
| 11,124,076 | B1 * | 9/2021 | Borghi | B62D 21/09 |
| 11,370,492 | B2 * | 6/2022 | Greber | B60K 11/00 |
| 11,465,482 | B2 * | 10/2022 | Menon | H01M 50/204 |
| 11,541,738 | B2 * | 1/2023 | Menon | B60K 1/04 |
| 12,024,007 | B2 * | 7/2024 | Günther | B60K 1/04 |
| 12,036,878 | B2 * | 7/2024 | Uemura | H01M 50/209 |
| 2018/0194212 | A1 | 7/2018 | Hamilton et al. | |
| 2019/0074496 | A1 * | 3/2019 | Hielscher | B60L 50/64 |
| 2019/0084441 | A1 | 3/2019 | Khan et al. | |
| 2019/0312247 | A1 * | 10/2019 | Hilmann | H01M 10/6552 |
| 2022/0297524 | A1 * | 9/2022 | Günther | H01M 50/238 |
| 2022/0388385 | A1 * | 12/2022 | Okonogi | H01M 50/262 |
| 2024/0166060 | A1 * | 5/2024 | Tyerman | H01M 50/242 |

FOREIGN PATENT DOCUMENTS

| | | |
|---|---|---|
| CN | 107379949 A | 11/2017 |
| CN | 110282015 A | 9/2019 |
| DE | 10 2016 113 759 A1 | 4/2017 |
| JP | 2013-67255 A | 4/2013 |
| JP | 2014-69686 A | 4/2014 |
| JP | 2014-80117 A | 5/2014 |
| JP | 2016-113063 A | 6/2016 |
| JP | 2018-118673 A | 8/2018 |
| JP | 2018-144700 A | 9/2018 |
| JP | 2019-156030 A | 9/2019 |
| WO | WO 2019/208750 A1 | 10/2019 |

OTHER PUBLICATIONS

Chinese Office Action issued in Chinese application No. 202080082755.4 dated Jun. 30, 2023, with English translation (Fourteen (14) pages).

PCT/JP2020/038377, International Search Report dated Dec. 15, 2020 (Two (2) pages).

* cited by examiner

BATTERY PACK SUPPORT DEVICE FOR VEHICLE

TECHNICAL FIELD

The present invention relates to a vehicle battery pack support device.

BACKGROUND ART

In recent years, from the viewpoint of an environmental impact, electric vehicles are under development also in the field of commercial vehicles such as trucks (Patent Document 1). It is desirable that a battery pack mounted in such an electric truck is arranged between frames in terms of securing side collision safety of the battery pack.

CITATION LIST

Patent Document

PATENT DOCUMENT 1: Japanese Unexamined Patent Publication No. 2016-113063

SUMMARY OF THE INVENTION

Technical Problem

However, there are various sizes of battery packs for running a vehicle and some of the battery packs are too large to fit between a pair of frames of the electric truck. In a case of employing such a battery pack, it is not possible to arrange the battery pack between frames.

In addition, there is a demand to employ a common battery pack used in passenger cars for electric trucks in order to reduce costs. However, in case of passenger cars, the battery pack is mounted inside a vehicle body, but in case of electric trucks, the battery pack is arranged so as to be exposed to the outside.

Under these circumstances, the present invention was made to provide a vehicle battery pack support device capable of securing torsional rigidity and side collision safety of a battery pack when a battery pack having a dimension that does not fit between frames of an electric truck is mounted.

Solution to the Problem

The present invention was made to overcome at least some of the problems described above, and can be implemented as the following embodiments or application examples.

(1) A vehicle battery pack support device according to an application example is a support device for a battery pack that is mounted below a pair of side rails extending in a longitudinal direction of a vehicle and has a pair of side faces each facing in the longitudinal direction of the vehicle, the side faces each having a long side that is orthogonal to the longitudinal direction of the vehicle and extends beyond the side rails in a vehicle width direction, the vehicle battery pack support device comprising: a battery bracket for housing the battery pack; and a frame bracket for coupling the side rails and the battery bracket, the battery bracket including a first bracket covering the side faces of the battery pack, at least a portion of a top face that is continuous with the side faces, and at least a portion of a bottom face that is continuous with the side faces, the first bracket having a dimension in the vehicle width direction which is equal to or larger than the long side of the battery pack, and a second bracket covering an end portion of the first bracket in the vehicle width direction and coupled to the frame bracket.

As described above, the vehicle battery pack support device has a structure in which the first brackets are longer than the long sides of the front side face and the rear side face of the battery pack, and cover the front side face and the rear side face to prevent an impact from being directly transferred to the battery pack even when the impact is applied from a lateral side in the vehicle width direction.

In addition, the second brackets cover end portions of the first brackets in the vehicle width direction, so that it is possible to improve torsional rigidity of the battery bracket and substantially prevent fragments or the like from directly reaching the battery pack even when an object collides from a lateral side in the vehicle width direction.

The battery bracket including the first brackets and the second brackets can be easily formed so as to fit the shape of the battery pack. Further, the battery bracket is coupled to the side rails via the frame bracket to support the battery pack, so that the battery pack that has a size larger than the distance between the frames of the electric truck can be easily mounted, and that torsional rigidity and side collision safety of the battery pack can be secured.

(2) In the vehicle battery pack support device according to the application example of the above configuration (1), the first bracket may include: a first web that covers the side face of the battery pack facing a front side of the vehicle; a first top flange that is continuous with the first web and covers the top face; and a first bottom flange that is continuous with the first web and covers the bottom face. It is thus possible to cushion an impact applied from the front side of the vehicle, and improve front collision safety of the battery pack.

(3) In the vehicle battery pack support device according to the application example of the above configuration (1), the first bracket may have a cylindrical shape integrally covering the side faces, the top face, and the bottom face. This configuration can further improve torsional rigidity of the battery bracket.

(4) In the vehicle battery pack support device according to the application example of any one of the above configurations (1) to (3), the second bracket may include: a second top flange coupled to the first top flange of the first bracket; a second bottom flange coupled to the first bottom flange of the first bracket; and a second web coupling the second top flange and the second bottom flange. Therefore, the second bracket has a structure of sandwiching and holding the first bracket, which makes it possible to improve torsional rigidity of the battery bracket.

(5) In the vehicle battery pack support device according to the application example of the above configuration (4), at least one of the second top flange or the second bottom flange of the second bracket may be formed to have a larger dimension in the vehicle width direction at an end portion in the longitudinal direction of the vehicle than that of a central portion. It is thus possible to reduce weight of the battery bracket and secure torsional rigidity of the battery bracket.

(6) In the vehicle battery pack support device according to the application example of the above configuration (4), a space may be formed between the second web of the second bracket and a side face of the battery pack in the vehicle width direction. It is thus possible to substantially prevent a situation in which even when the second brackets are deformed due to an impact applied from the side of the vehicle, the second brackets directly come into contact with the battery pack and transfer the impact.

DESCRIPTION OF EMBODIMENTS

Figure 1:
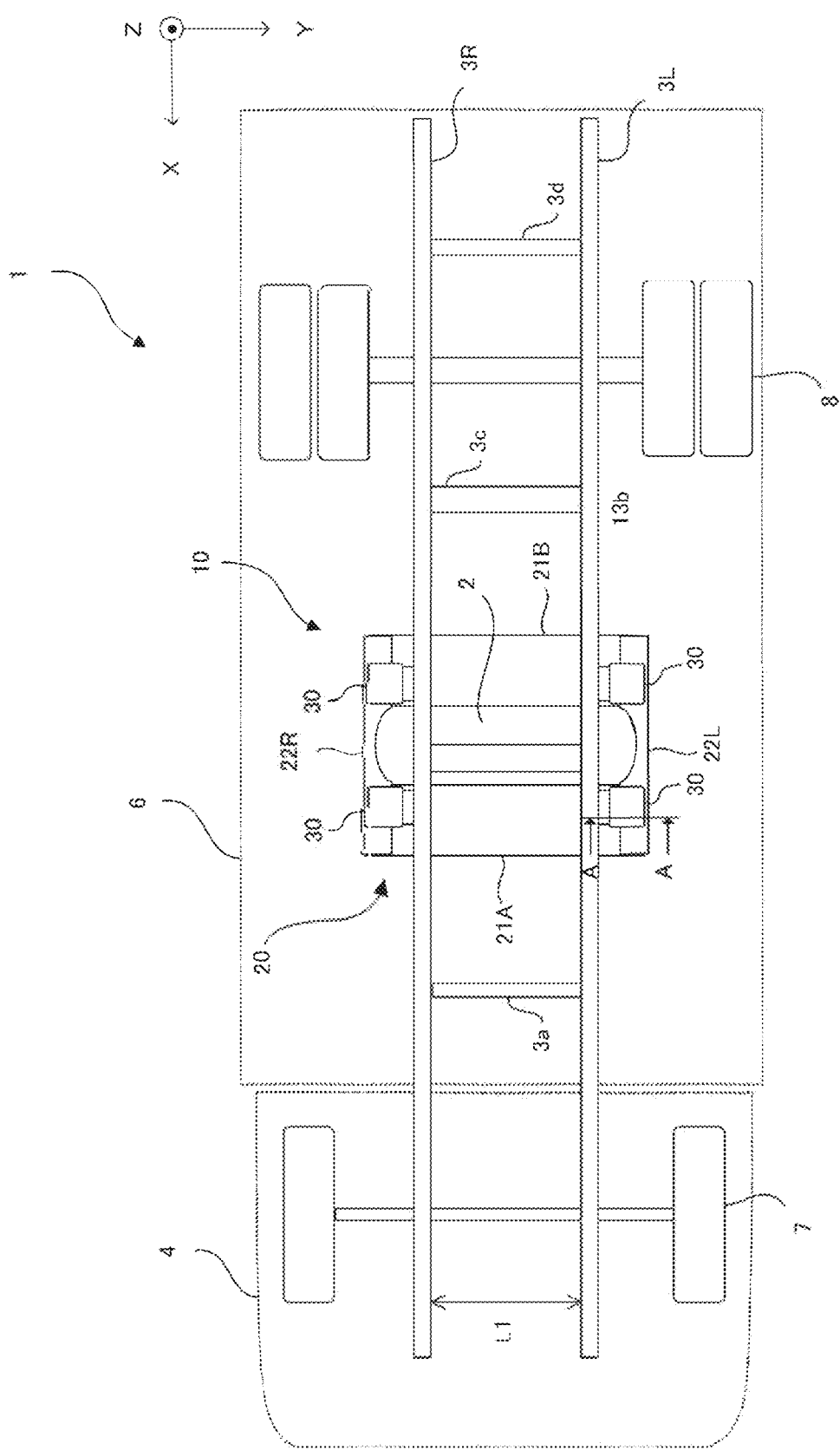
FIG. 1 is a schematic top view illustrating an overall configuration of a vehicle including a vehicle battery pack support device according to an embodiment.

An embodiment of the present invention will be described in detail below with reference to the drawings. The drawings are not necessarily to scale. FIG. 1 is a schematic top view illustrating an overall configuration of a vehicle including a vehicle battery pack support device according to the present embodiment. The shapes of components described below are, basically, horizontally symmetrical with respect to the center of the vehicle 1 in a vehicle width direction (Y direction in the drawings). Therefore, basically, only one of left and right components is described in the following description, but the other components which are symmetrical to their counterparts have the same shapes as their counterparts.

The vehicle 1 includes a motor (electric motor) (not shown) as a driving power source, and is, for example, a so-called electric vehicle. In the present embodiment in particular, the vehicle 1 is a truck vehicle provided with a cab 4 and a cargo box 6. The cab 4 is mounted on a chassis frame, and is adapted for a driver to board. The cargo box 6 is disposed behind the cab 4 and is configured to be capable of carrying the cargo. In the drawing, the cab 4 and the cargo box 6 are outlined with a dotted line.

The vehicle 1 may also be a hybrid car including an engine in addition to a motor as the driving power source. Further, the vehicle 1 is not limited to the truck vehicle, and may be any other commercial vehicle including a battery for driving the vehicle.

The chassis frame is what is called a ladder frame including a pair of side rails 3L and 3R extending in a longitudinal direction (X direction in the drawings) of the vehicle, and a plurality of cross members 3a, 3b, 3c, and 3d arranged between the side rails 3L and 3R along the vehicle width direction (Y direction in the drawings). The side rails are simply referred to as side rails without specifying left and right side rails. The chassis frame having such a configuration can achieve both of static strength for enduring a weight of the truck vehicle and dynamic strength (fatigue strength) for enduring repetitive load application caused by road surface vibrations or the like during traveling.

Further, front wheels 7 are suspended at a front portion of the chassis frame and rear wheels 8 are suspended at a rear portion of the chassis frame. A driving force is transmitted to these wheels by the motor (not shown) such that the vehicle 1 can travel. A battery for feeding power to the motor as such a driving power source is mounted in the vehicle 1 via a support device 10.

The battery has a configuration in which a battery unit (not shown) including a plurality of secondary battery cells is housed in a battery pack 2 which is a casing. The battery pack 2 is supported on the side rails 3R and 3L constituting the chassis frame, via the support device 10 as illustrated in FIG. 1.

The support device 10 includes a battery bracket 20 and a frame bracket 30.

The battery bracket 20 includes a pair of front first bracket 21A and rear first bracket 21B (also collectively referred to as first brackets 21A and 21B), and a pair of left second bracket 22L and right second bracket 22R (also collectively referred to as second brackets 22L and 22R).

A front portion and a rear portion of the second bracket 22L of the battery bracket 20 are coupled to and supported on the side rail 3L via the frame bracket 30, and a front portion and a rear portion of the second bracket 22R of the battery bracket 20 are coupled to and supported on the side rail 3R via the frame bracket 30.

Figure 2:
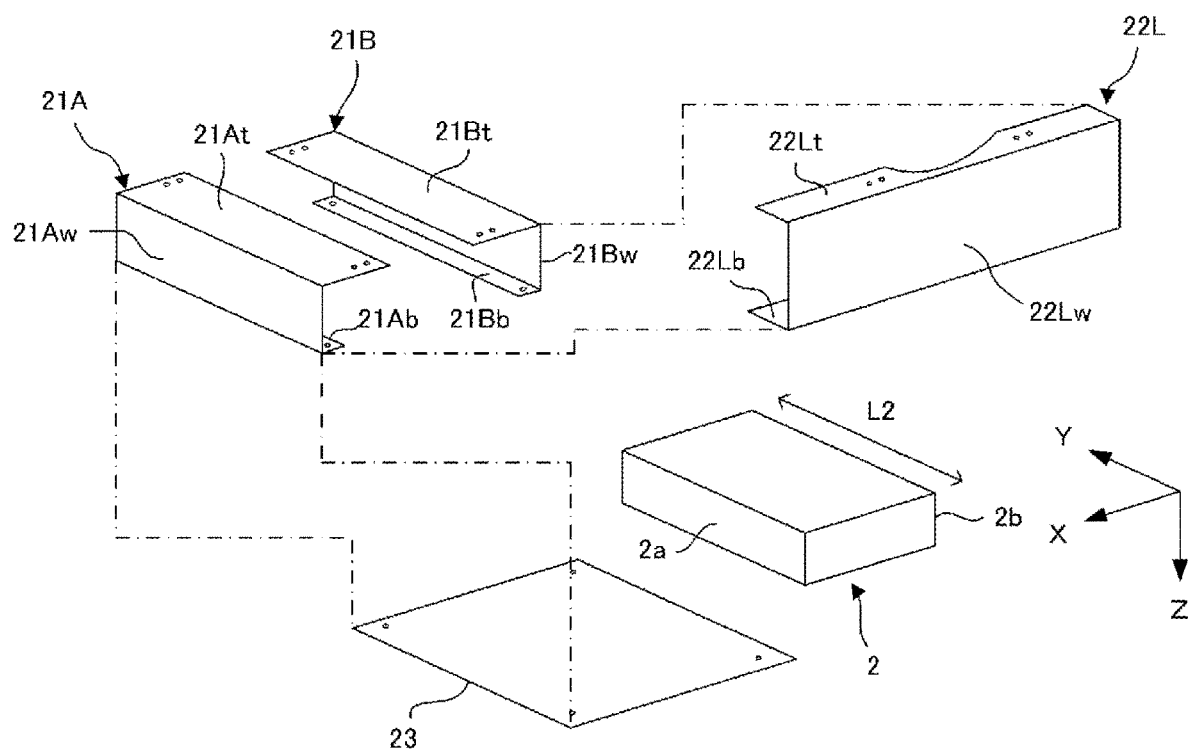
FIG. 2 is an exploded perspective view of a battery pack and a battery bracket.

FIG. 2 is an exploded perspective view of the battery pack and the battery bracket. The battery pack 2 is formed in a rectangular parallelepiped shape and has a front side face 2a which is a rectangular side face facing a front side of the vehicle, and a rear side face 2b which is a rectangular shape facing a rear side of the vehicle. The battery pack 2 is arranged along the vehicle width direction (Y direction in the drawings) so that long sides of the front side face 2a and the rear side face 2b are orthogonal to the longitudinal direction (X direction in the drawings) of the vehicle. The battery pack 2 is dimensioned so that both end portions of the battery pack 2 in the vehicle width direction extend beyond outer side faces of the side rails 3L and 3R in the vehicle width direction. A length L2 of each of the long sides of the front side face 2a and the rear side face 2b is larger than a length L1 between the side rails 3L and 3R.

An under cover 23 is a member on which the battery pack 2 is directly placed, and is implemented by, for example, a plate-shaped member. The under cover 23 is a cover that simply covers a bottom face of the battery pack 2, and it is the first brackets 21A and 21B that directly hold the battery pack 2.

The front first bracket 21A includes a first web 21Aw for covering the front side face 2a of the battery pack 2 in the drawing. Further, a first top flange 21At for covering a portion of a top face which is continuous with the front side face 2a of the battery pack 2, and a first bottom flange 21Ab for covering a portion of the bottom face which is continuous with the front side face 2a are formed so as to be vertically continuous with the first web 21Aw. In other words, the first top flange 21At and the first bottom flange 21Ab are arranged so that flat surface portions thereof face each other in a vehicle height direction (Z direction in the drawings). Thus, the front first bracket 21A is formed in a substantial "U" shape having a cross section that is open toward the rear side of the vehicle.

Similarly, the rear first bracket 21B includes a first web 21Bw for covering the rear side face 2b of the battery pack 2. Further, the rear first bracket 21B includes a first top flange 21Bt for covering a portion of the top face which is continuous with the rear side face 2b of the battery pack 2, and a first bottom flange 21Bb for covering a portion of the bottom face which is continuous with the rear side face 2b. In other words, the first top flange 21Bt and the first bottom flange 21Bb of the rear first bracket 21B are arranged so that flat surface portions thereof face each other in the vehicle height direction (Z direction in the drawings). Thus, the rear first bracket 21B is formed in a substantial "U" shape having a cross section that is open toward the front side of the vehicle.

The open side of the first bracket 21A and the open side of the first bracket 21B face each other, and the first brackets 21A and 21B support the battery pack 2 while sandwiching the battery pack 2 therebetween in the longitudinal direction of the vehicle.

The left second bracket 22L includes a second web 22Lw covering open faces of left end portions of the first brackets 21A and 21B in the vehicle width direction. Further, the second web 22Lw has, at an upper end thereof, a second top flange 22Lt which extends across the first top flanges 21At and 21Bt included in the first brackets 21A and 21B, respectively, and which is coupled to outer sides of the first top flanges 21At and 21Bt of the first brackets 21A and 21B Similarly, the second web 22Lw has, at a lower end thereof, a second bottom flange 22Lb which extends across the first bottom flanges 21Ab and 21Bb included in the first brackets 21A and 21B, respectively, and which is coupled to outer sides of the first bottom flanges 21Ab and 21Bb of the first brackets 21A and 21B.

The second top flange 22Lt and the second bottom flange 22Lb of the left second bracket 22L are each formed to have a larger dimension in the vehicle width direction at an end portion in the longitudinal direction of the vehicle than that of a central portion. Specifically, a central portion of each of the second top flange 22Lt and the second bottom flange 22Lb in the longitudinal direction of the vehicle is cut out in an arc shape. By doing so, torsional rigidity of a battery pack support device is improved while achieving weight reduction.

The right second bracket 22R is horizontally symmetrical to the left second bracket 22L and has a similar configuration, and thus a description thereof will be omitted.

In the drawing, when portions connected by a dot-and-dash line are aligned with each other, the battery bracket 20 surrounds four side faces and portions of the top face and the bottom face of the battery pack 2, like a box. The battery bracket 20 surrounding the battery pack 2 as described above is coupled to the side rails 3L and 3R via the frame bracket 30.

Figure 3:
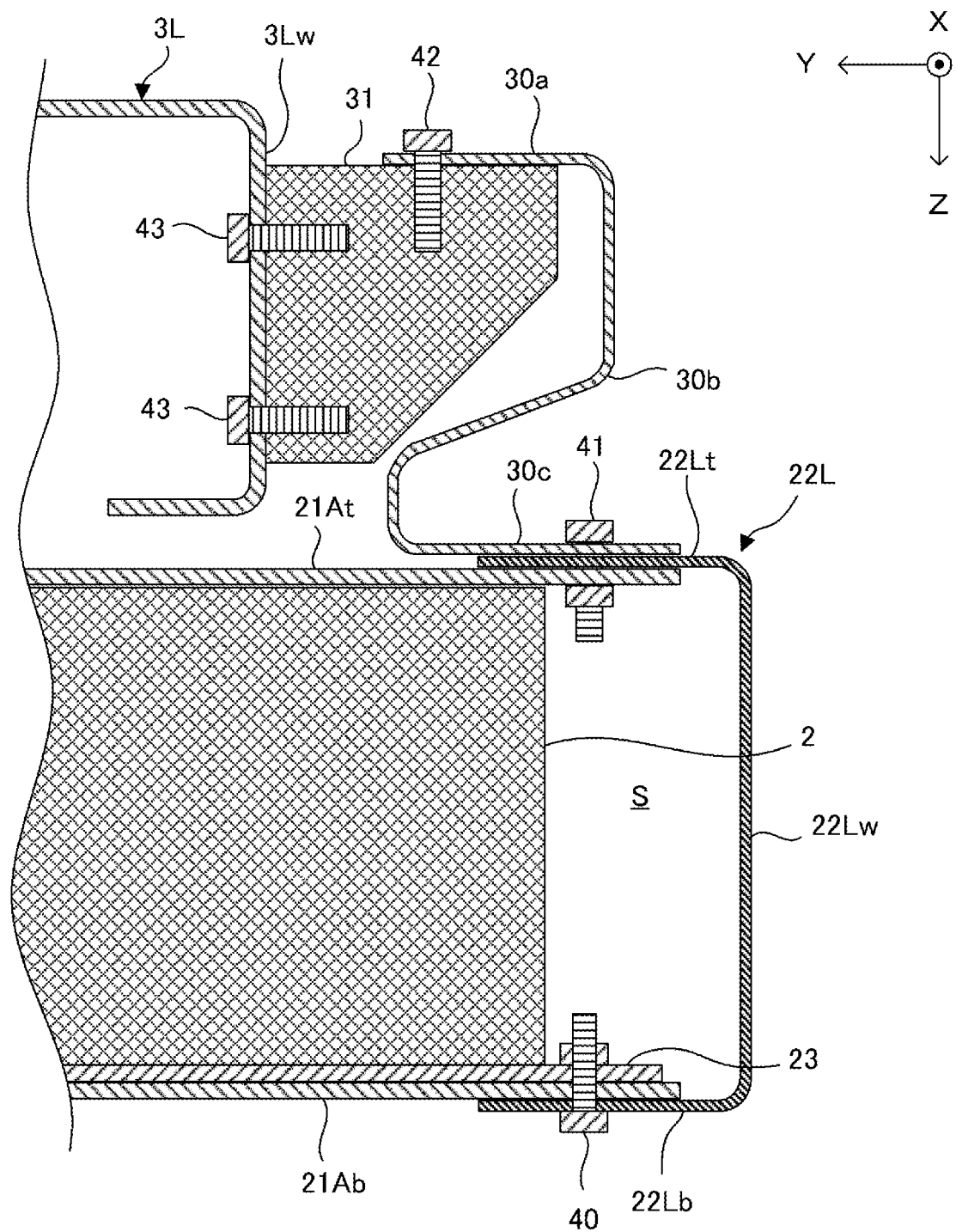
FIG. 3 is a cross-sectional view taken along line A-A of FIG. 1.

Referring to FIG. 3, FIG. 3 is a cross-sectional view taken along line A-A of FIG. 1.

Hereinafter, a left side portion of the support device 10 suspended on the side rail 3L will be described by way of example with reference to the drawing. A right side portion of the support device 10 suspended on the side rail 3R is horizontally symmetrical to the left side portion of the support device 10 and has a similar configuration, and thus a detailed description thereof will be omitted.

As described above, the battery pack 2 is placed on the under cover 23, and the front portion and the rear portion of the battery pack 2 are covered by the first brackets 21A and 21B, respectively. Specifically, the first webs 21Aw and 21Bw and the first top flanges 21At and 21St of the first brackets 21A and 21B are in contact with corresponding faces of the battery pack 2 (the front side face 2a, the rear side face 2b, and a portion of the top face), respectively, and the first bottom flanges 21Ab and 21Bb are in contact with the under cover 23.

In addition, the left second bracket 22L covers the under cover 23 and the first brackets 21A and 21B from the outside while leaving a space S between the left second bracket 22L and a left side face of the battery pack 2 in the vehicle width direction. The size of the space S can be adjusted by changing dimensions of the second top flange 22Lt and the second bottom flange 22Lb of the left second bracket 22L in the vehicle width direction, and can be adjusted also by changing dimensions of the first brackets 21A and 21B in the vehicle width direction.

The second bottom flange 22Lb of the left second bracket 22L is in contact with the first bottom flanges 21Ab and 21Bb of the first brackets 21A and 21B. The second bottom flange 22Lb of the left second bracket 22L, the first bottom flanges 21Ab and 21Bb of the first brackets 21A and 21B, and the under cover 23 are coupled to one another with a plurality of bolts 40 (only one bolt is illustrated in FIG. 3).

The second top flange 22Lt of the left second bracket 22L is in contact with the first top flanges 21At and 21Bt of the first brackets 21A and 21B, and the frame bracket 30. The second top flange 22Lt of the left second bracket 22L, the first top flanges 21At and 21Bt of the first brackets 21A and 21B, and a lower portion 30c of the frame bracket 30 are coupled to one another with a plurality of bolts 41 (only one bolt is illustrated in FIG. 3).

The frame bracket 30 is, for example, a member including an upper portion 30a, a central portion 30b, and the lower portion 30c, and having an "S" shaped cross section as illustrated in the drawing. A rib (not shown) is provided on a side face of the frame bracket 30 to increase strength. The upper portion 30a of the frame bracket 30 is coupled to a mount 31 with a plurality of bolts 42 (only one bolt is illustrated in FIG. 3).

The mount 31 is a member connecting the frame bracket 30 and the side rail 3L to each other. For example, the mount 31 is coupled to a web 3Lw of the side rail 3L with a plurality of bolts 43 (only two bolts are illustrated in FIG. 3). The mount 31 is, for example, a rubber mount, and includes an elastic material such as rubber therein to elastically hold the frame bracket 30 with respect to the side rail 3L.

As described above, the support device 10 has a structure in which the first brackets 21A and 21B having rigidity substantially equivalent to the chassis frame are longer than the long sides of the front side face 2a and the rear side face 2b of the battery pack 2, and cover the front side face 2a and the rear side face 2b to prevent an impact from being directly transferred to the battery pack 2 even when the impact is applied from a lateral side in the vehicle width direction.

In addition, the second brackets 22L and 22R cover end portions of the first brackets 21A and 21B in the vehicle width direction, so that it is possible to improve torsional rigidity of the battery bracket 20 and substantially prevent fragments or the like from directly reaching the battery pack 2 even when an object collides from a lateral side in the vehicle width direction.

The battery bracket 20 including the first brackets 21A and 21B and the second brackets 22L and 22R can be easily formed so as to fit the shape of the battery pack 2. Further, the battery bracket 20 is coupled to the side rails 3L and 3R via the frame bracket 30 to support the battery pack 2, so that the battery pack 2 that has a size larger than the distance between the side rails 3L and 3R of the electric truck can be easily mounted, and that torsional rigidity and side collision safety of the battery pack 2 can be secured.

Particularly, in the front first bracket 21A, the first top flange 21At and the first bottom flange 21Ab are integrally and continuously formed with the first web 21Aw covering the front side face 2a of the battery pack 2, so that it is possible to cushion an impact applied from the front side of the vehicle, and improve front collision safety of the battery pack.

Further, the second brackets 22L and 22R include the second top flanges 22Lt and 22Rt coupled to the first top flanges 21At and 21Bt, and the second bottom flanges 22Lb and 22Rb coupled to the first bottom flanges 21Ab and 21Bb of the first brackets 21A and 21B, and thus have a structure of sandwiching and holding the first brackets 21A and 21B. As a result, it is possible to improve torsional rigidity of the battery bracket 20.

In addition, the second top flanges 22Lt and 22Rt and the second bottom flanges 22Lb and 22Rb of the second brackets 22L and 22R are each formed to have a larger dimension in the vehicle width direction at an end portion in the longitudinal direction of the vehicle than that of a central portion. It is thus possible to reduce weight of the battery bracket 20 and secure torsional rigidity of the battery bracket 20.

Further, the space S is formed between the second webs 22Lw and 22Rw of the second brackets 22L and 22R, and side faces of the battery pack 2 in the vehicle width direction. It is thus possible to substantially prevent a situation in which even when the second brackets 22L and 22R are deformed due to an impact applied from the side of the vehicle, the second brackets 22L and 22R directly come into contact with the battery pack 2 and transfer the impact.

Although the description of the embodiment of the vehicle battery pack support device of the present invention ends here, the present invention is not limited to this embodiment.

Figure 4:
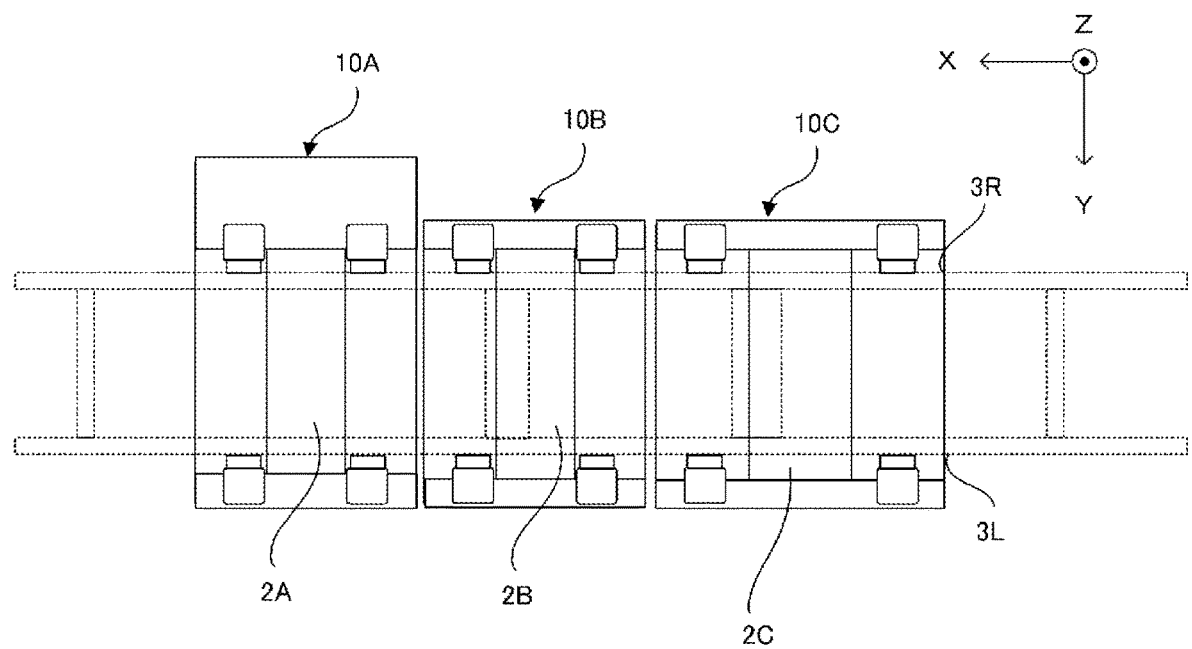
FIG. 4 is a schematic top view illustrating an overall configuration of a vehicle including a vehicle battery pack support device according to another embodiment.

For example, FIG. 4 is a schematic top view of a vehicle including a vehicle battery pack support device according to another embodiment. According to this embodiment, as illustrated in FIG. 4, three battery packs 2A, 2B, and 2C are arranged in a longitudinal direction of the vehicle and supported by support devices 10A, 10B, and 10C, respectively.

The battery pack 2B and the support device 10B arranged at the center in the longitudinal direction of the vehicle are similar to those of the embodiment described above, whereas the battery pack 2A and the support device 10A arranged at a front side of the vehicle each have a longer dimension in the vehicle width direction and are offset toward the right side of the vehicle. The battery pack 2C and the support device 10C arranged at a rear side of the vehicle each have a longer dimension in the longitudinal direction of the vehicle than those of the central battery pack 2B and the support device 10B.

The support devices 10A, 10B, and 10C can easily fit the shapes or layouts of the battery packs 2A, 2B, and 2C, respectively. It is thus possible to obtain similar effects to those of the embodiment described above.

Further, the front and rear first brackets 21A and 21B of the battery bracket 20 are paired according to the embodiment described above, but are not limited thereto. For example, two bracket members each having an "L" shaped cross section may be vertically combined to function as one of the first brackets. Alternatively, the pair of front and rear first brackets 21A and 21B may be integrally formed in a cylindrical shape. This configuration further improves torsional rigidity of the battery bracket 20.

Although the embodiments of the present invention have been described above, the present invention can be implemented in various other forms, and various omissions, replacements, and changes can be made without departing from the spirit of the present invention. The embodiments and variations are included in the scope and spirit of the invention, as well as in the invention of claims and the equivalents thereof.

DESCRIPTION OF REFERENCE CHARACTERS

1 Vehicle
2, 2A, 2B, 2C Battery Pack
3L, 3R Side Rail
10, 10A, 10B, 10C Support Device
20 Battery Bracket
21A, 21B First Bracket
22L, 22R Second Bracket
23 Under Cover
30 Frame Bracket
31 Mount

The invention claimed is:

1. A vehicle battery pack support device for a battery pack that is mounted below a pair of side rails extending in a longitudinal direction of a vehicle and has a pair of side faces each facing in the longitudinal direction of the vehicle, the vehicle battery pack support device comprising:
   a battery bracket for housing the battery pack; and
   a frame bracket for coupling the side rails and the battery bracket, the battery bracket including:
      a first bracket covering the side faces of the battery pack, at least a portion of a top face that is continuous with the side faces, and at least a portion of a bottom face that is continuous with the side faces, the first bracket having a dimension in the vehicle width direction which is equal to or larger than the long side of the battery pack, and
      a second bracket covering an end portion of the first bracket in the vehicle width direction and coupled to the frame bracket;
   wherein the first bracket comprises a plurality of bracket members each having a U-shaped cross-section, wherein the U-shaped cross-section is defined by:
      a web portion that covers a corresponding side face of the battery pack;
      a top flange portion continuous with the web portion that covers at least a portion of the top face of the battery pack; and
      a bottom flange portion continuous with the web portion that covers at least a portion of the bottom face of the battery pack;
   wherein the plurality of bracket members are arranged along the longitudinal direction of the vehicle so as to collectively cover the side faces, the top face, and the bottom face of the battery pack.

2. The vehicle battery pack support device of claim 1, wherein
   the second bracket includes:
      a second top flange coupled to the respective top flange portions of the plurality of bracket members of the first bracket;
      a second bottom flange coupled to the respective bottom flange portions of the plurality of bracket members of the first bracket; and
      a second web coupling the second top flange and the second bottom flange.

3. A vehicle battery pack support device for a battery pack that is mounted below a pair of side rails extending in a longitudinal direction of a vehicle and has a pair of side faces each facing in the longitudinal direction of the vehicle, the vehicle battery pack support device comprising:
   a battery bracket for housing the battery pack; and
   a frame bracket for coupling the side rails and the battery bracket. the battery bracket including:
      a first bracket covering the side faces of the battery pack, at least a portion of a top face that is continuous with the side faces, and at least a portion of a bottom face that is continuous with the side faces, the first bracket having a dimension in the vehicle width direction which is equal to or larger than the long side of the battery pack, and a second bracket covering an end portion of the first bracket in the vehicle width direction and coupled to the frame bracket;

wherein the second bracket includes:
- a second top flange coupled to a first top flange of the first bracket;
- a second bottom flange coupled to a first bottom flange of the first bracket; and
- a second web coupling the second top flange and the second bottom flange;

wherein at least one of the second top flange or the second bottom flange of the second bracket is formed to have a larger dimension in the vehicle width direction at an end portion in the longitudinal direction of the vehicle than that of a central portion.

4. The vehicle battery pack support device of claim 2, wherein a space is formed between the second web of the second bracket and a side face of the battery pack in the vehicle width direction.

\* \* \* \* \*